US012789518B2

(12) United States Patent
Osawa et al.

(10) Patent No.: US 12,789,518 B2
(45) Date of Patent: Nov. 10, 2026

(54) METHOD FOR MANUFACTURING DISPLAY DEVICE

(71) Applicant: Magnolia White Corporation, Tokyo (JP)

(72) Inventors: Shuichi Osawa, Tokyo (JP); Yoshikatsu Imazeki, Tokyo (JP); Yoichi Kamijo, Tokyo (JP); Koichi Miyasaka, Tokyo (JP); Yoshifumi Kamei, Tokyo (JP)

(73) Assignee: Magnolia White Corporation, Tokyo (JP)

( * ) Notice: Subject to any disclaimer, the term of this patent is extended or adjusted under 35 U.S.C. 154(b) by 87 days.

(21) Appl. No.: 18/379,885

(22) Filed: Oct. 13, 2023

(65) Prior Publication Data

US 2024/0131830 A1 Apr. 25, 2024
US 2024/0227375 A9 Jul. 11, 2024

(30) Foreign Application Priority Data

Oct. 19, 2022 (JP) ................................ 2022-167783

(51) Int. Cl.
*B32B 37/12* (2006.01)
*G02F 1/1335* (2006.01)

(52) U.S. Cl.
CPC ........ *B32B 37/12* (2013.01); *G02F 1/133514* (2013.01); *B32B 2457/20* (2013.01); *G02F 2202/28* (2013.01)

(58) Field of Classification Search
CPC ................ B32B 37/12; B32B 2457/20; G02F 1/133514; G02F 2202/28; G02F 1/133621; G02F 1/133504; G02F 1/1303; G02F 1/133521; G02F 1/133567; G02F 1/1362
See application file for complete search history.

(56) References Cited

U.S. PATENT DOCUMENTS 5,953,089 A * 9/1999 Hiji .................... G02F 1/13725 349/86
6,151,166 A 11/2000 Matsushita et al.
2010/0208188 A1* 8/2010 Tsai ................. G02F 1/133305 257/E27.111
2017/0139123 A1* 5/2017 Ochi ................ G02F 1/133308

FOREIGN PATENT DOCUMENTS

JP H10319217 A 12/1998
JP 2016042267 A * 3/2016

OTHER PUBLICATIONS

JP2016042267A Machine Translation of Description (Year: 2025).*

* cited by examiner

*Primary Examiner* — Katelyn W Smith
(74) *Attorney, Agent, or Firm* — K&L Gates LLP

(57) ABSTRACT

A method for manufacturing a display device includes applying an adhesive to a display panel having a display surface where an image is displayed and an opposite surface on an opposite side of the display surface, on the opposite surface, sprinkling a gap member of a given size on the opposite surface of the display panel to which the adhesive has been applied, and sticking together a board surface of a color separation element and the opposite surface of the display panel on which the gap member has been sprinkled, with the adhesive between the board surface and the opposite surface, the color separation element dispersing light from a light source and emitting a plurality of rays of separated light with wavelengths different from each other.

6 Claims, 8 Drawing Sheets

METHOD FOR MANUFACTURING DISPLAY DEVICE

CROSS-REFERENCE TO RELATED APPLICATION

This application claims the benefit of priority from Japanese Patent Application No. 2022-167783 filed on Oct. 19, 2022, the entire contents of which are incorporated herein by reference.

BACKGROUND

1. Technical Field

The present disclosure relates to a method for manufacturing a display device.

2. Description of the Related Art

The display device in Japanese Patent Application Laid-open Publication No. H10-319217 (JP-A-H10-319217) includes a liquid crystal display panel having pixels, a color separation element, and a surface light source device that irradiates the color separation element with light. The color separation element separates light from the surface light source device into beams of light in colors different from each other and focuses the beams of light on the pixels of the display panel.

In the display device in JP-A-H10-319217, the liquid crystal display panel (display panel) and the color separation element desirably have a given distance therebetween so that the light from the color separation element is focused on the pixels. A gap with the aforementioned given distance is formed by containing a gap member with a given size in an adhesive and having the gap member sandwiched between the display panel and the color separation element when the display panel and the color separation element are bonded with the adhesive therebetween, for example.

However, when the gap member is mixed with the adhesive, foreign matter may be mixed into the adhesive, and air mixed into the adhesive may remain as voids even after a defoaming process is performed. Thus, the adhesive force of the adhesive may be decreased.

It is an object of the present disclosure to provide a method for manufacturing a display device that can suppress a decrease in adhesive force of an adhesive.

SUMMARY

A method for manufacturing a display device is disclosed. The method includes applying an adhesive to a display panel having a display surface where an image is displayed and an opposite surface on an opposite side of the display surface, on the opposite surface, sprinkling a gap member of a given size on the opposite surface of the display panel to which the adhesive has been applied, and sticking together a board surface of a color separation element and the opposite surface of the display panel on which the gap member has been sprinkled, with the adhesive between the board surface and the opposite surface, the color separation element dispersing light from a light source and emitting a plurality of rays of separated light with wavelengths different from each other.

A method for manufacturing a display device is disclosed. The method includes applying an adhesive to a color separation element having an emitting surface, on the emitting surface, the color separation element dispersing light from a light source and emitting a plurality of rays of separated light with wavelengths different from each other, sprinkling a gap member of a given size on the emitting surface of the color separation element to which the adhesive has been applied, and sticking together a board surface of a display panel and the emitting surface of the color separation element on which the gap member has been sprinkled, with the adhesive between the board surface and the emitting surface.

DETAILED DESCRIPTION

Figure 1:
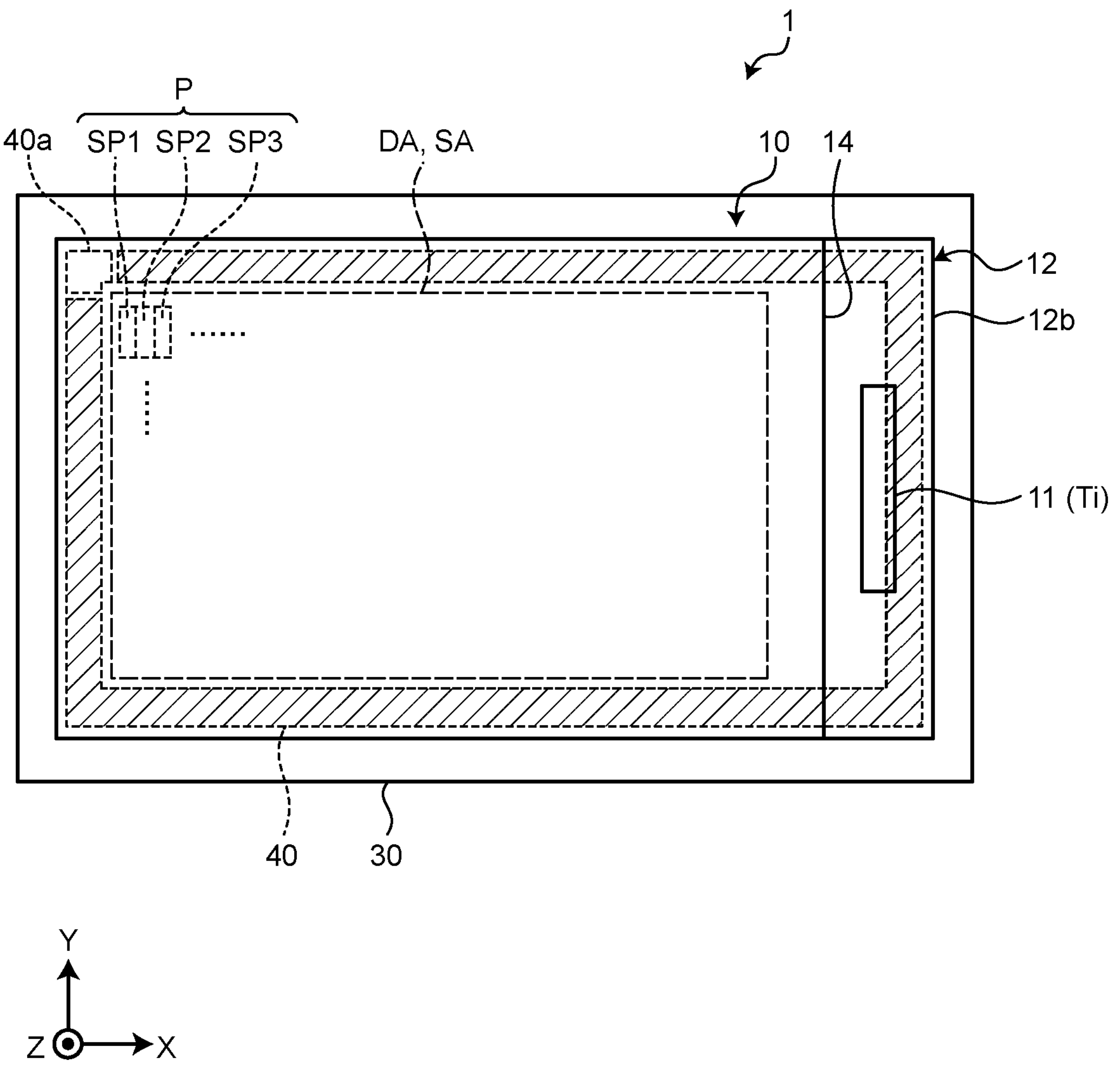
FIG. 1 is a plan view of a display device according to an embodiment of the present disclosure.

Embodiments of the present disclosure will be described below with reference to the drawings. The present disclosure is not limited by what is described in the following embodiments. Components described below include those that can be easily assumed by a person skilled in the art and those that are substantially the same. Furthermore, the components described below can be combined as appropriate.

What is disclosed herein is merely an example, and any appropriate modification that would be easily conceived of by a person skilled in the art, while maintaining the purport of the present disclosure, is naturally included in the scope of the present disclosure. The drawings may schematically illustrate the width, thickness, shape, and the like of each part compared to the actual mode for the sake of clarity of explanation, but this is merely an example and does not limit the interpretation of the present disclosure. In the present specification and the drawings, elements similar to those described previously with respect to the drawings already mentioned are given the same reference signs and the detailed description thereof may be omitted as appropriate.

The X and Y directions illustrated in the drawings are orthogonal to each other and parallel to a main surface of a substrate included in a display device 1. The +X and −X sides in the X direction and the +Y and −Y sides in the Y direction correspond to the sides of the display device 1. The Z direction is orthogonal to the X and Y directions and corresponds to the thickness direction of the display device 1. The +Z side in the Z direction corresponds to the front surface side where an image is displayed in the display device 1, and the −Z side in the Z direction corresponds to the rear surface side of the display device 1. In the present specification, "plan view" refers to viewing the display device 1 from the +Z side to the −Z side along the Z direction. The X, Y, and Z directions are examples, and the present disclosure is not limited to these directions.

Display Device 1

Figure 2:
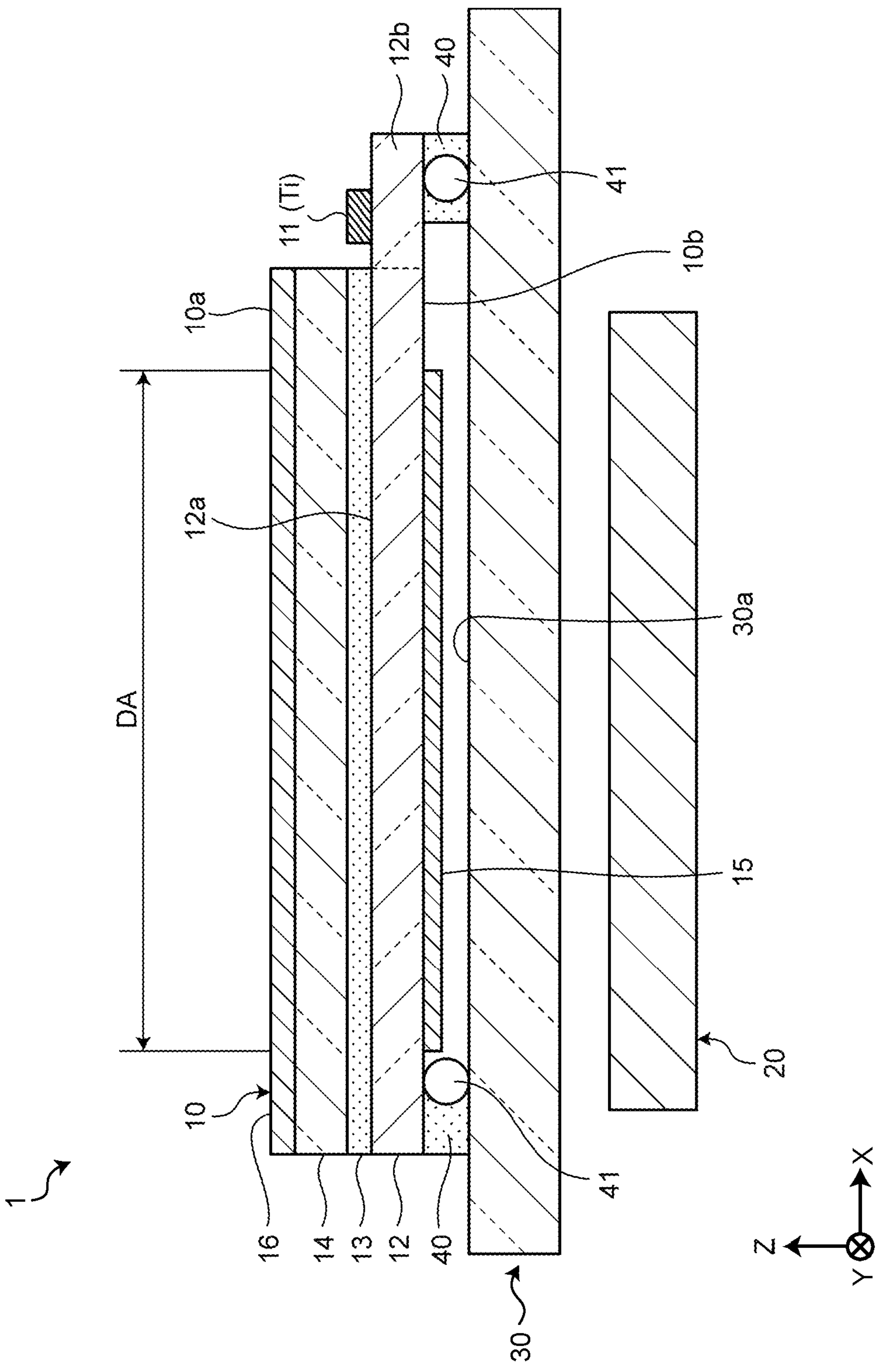
FIG. 2 is a sectional view of the display device.

FIG. 1 is a plan view of the display device 1 according to an embodiment of the present disclosure. FIG. 2 is a sectional view of the display device 1. The display device 1 displays images on the basis of image signals output from an external device (not illustrated) that is electrically coupled through a flexible wiring board (not illustrated).

The display device 1 is applied, for example, to a head-up display. The head-up display projects an image onto a translucent object, such as a vehicle windshield, to allow a user to see a virtual image. The display device 1 includes a display panel 10, a light source device 20, a color separation element 30, and an adhesive portion 40. The light source device 20, the color separation element 30, and the display panel 10 are aligned in this order along the Z direction from the −Z side to the +Z side.

The display panel 10 is a transmissive liquid crystal display. The display panel 10 may be, for example, an organic electroluminescent (EL) display and an inorganic EL display. As illustrated in FIG. 1, the front surface of the display panel 10 has a display region DA where images are displayed. As illustrated in FIG. 2, the front surface of the display panel 10 corresponds to a display surface 10*a* where images are displayed. The rear surface of the display panel 10 on the opposite side of the display surface 10*a* corresponds to an opposite surface 10*b*. The display panel 10 includes a plurality of pixels P aligned in a matrix (row-column configuration) along the X and Y directions in the display region DA.

The pixels P each have a first sub-pixel SP1, a second sub-pixel SP2, and a third sub-pixel SP3. The first sub-pixel SP1 is a red sub-pixel. The second sub-pixel SP2 is a green sub-pixel. The third sub-pixel SP3 is a blue sub-pixel. The first sub-pixel SP1, the second sub-pixel SP2 and the third sub-pixel SP3 are aligned in this order along the X direction. The array of the first sub-pixel SP1, the second sub-pixel SP2 and the third sub-pixel SP3 is what is called a stripe array. Hereinafter, when the first sub-pixel SP1, the second sub-pixel SP2, and the third sub-pixel SP3 are described without distinction, they may simply be described as a "sub-pixel SP". Not to mention, the array of sub-pixels SP is not limited to a stripe array, and the colors of sub-pixels SP are not limited to the aforementioned colors.

Figure 3:
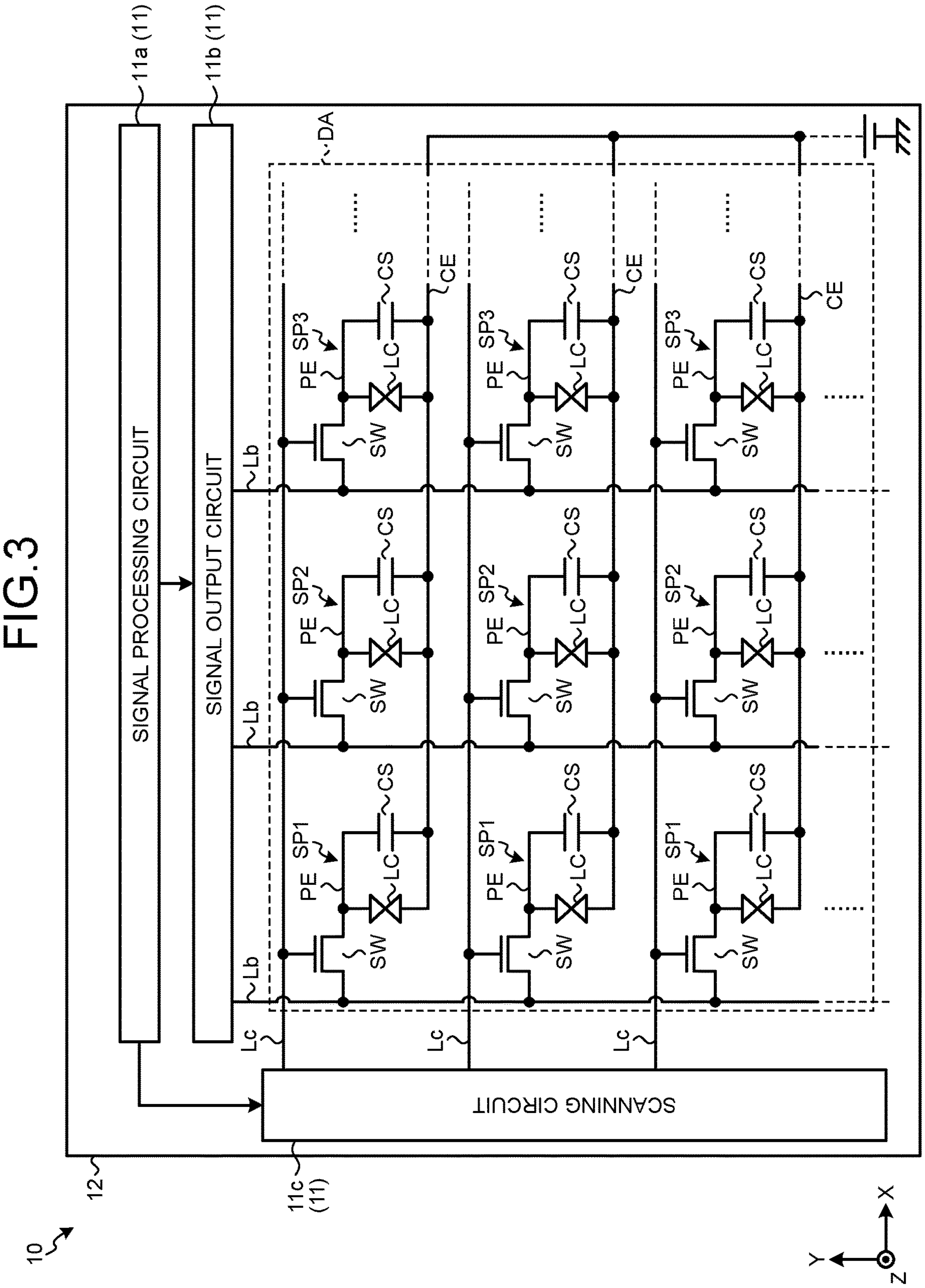
FIG. 3 is a view illustrating a circuit configuration of a display panel.

FIG. 3 is a view illustrating a circuit configuration of the display panel 10. The display panel 10 includes a drive circuit 11, as well as a switching element SW, a sub-pixel electrode PE, a common electrode CE, a liquid crystal capacitance LC, and a holding capacitance CS that are included in each of a plurality of the sub-pixels SP.

The drive circuit 11 drives the pixel P. The drive circuit 11 includes a signal processing circuit 11*a*, a signal output circuit 11*b*, and a scanning circuit 11*c*.

The signal processing circuit 11*a* outputs sub-pixel signals indicating gradations of the sub-pixels SP to the signal output circuit 11*b* on the basis of image signals transmitted from the external device. The signal processing circuit 11*a* outputs clock signals to the signal output circuit 11*b* and the scanning circuit 11*c* to synchronize the operation of the signal output circuit 11*b* with that of the scanning circuit 11*c*.

The signal output circuit 11*b* outputs the sub-pixel signals to the sub-pixels SP. The signal output circuit 11*b* and the sub-pixels SP are electrically coupled through a plurality of signal lines Lb extending along the Y direction.

The scanning circuit 11*c* scans the sub-pixels SP in synchronization with the output of the sub-pixel signals by the signal output circuit 11*b*. The scanning circuit 11*c* and the sub-pixels SP are electrically coupled through a plurality of scanning lines Lc extending along the X direction.

The switching element SW includes a thin-film transistor (TFT), for example. In the switching element SW, a source electrode is electrically coupled to the signal line Lb, and a gate electrode is electrically coupled to the scanning line Lc.

The sub-pixel electrode PE is coupled to a drain electrode of the switching element SW. A plurality of the common electrodes CE are arranged corresponding to the scanning lines Lc. The sub-pixel electrode PE and the common electrode CE are translucent.

The liquid crystal capacitance LC is a capacitive component of a liquid crystal material in a liquid crystal layer 13, which will be described below, between the sub-pixel electrode PE and the common electrode CE. The holding capacitance CS is placed between an electrode with the same potential as the common electrode CE and an electrode with the same potential as the sub-pixel electrode PE.

Figure 4:
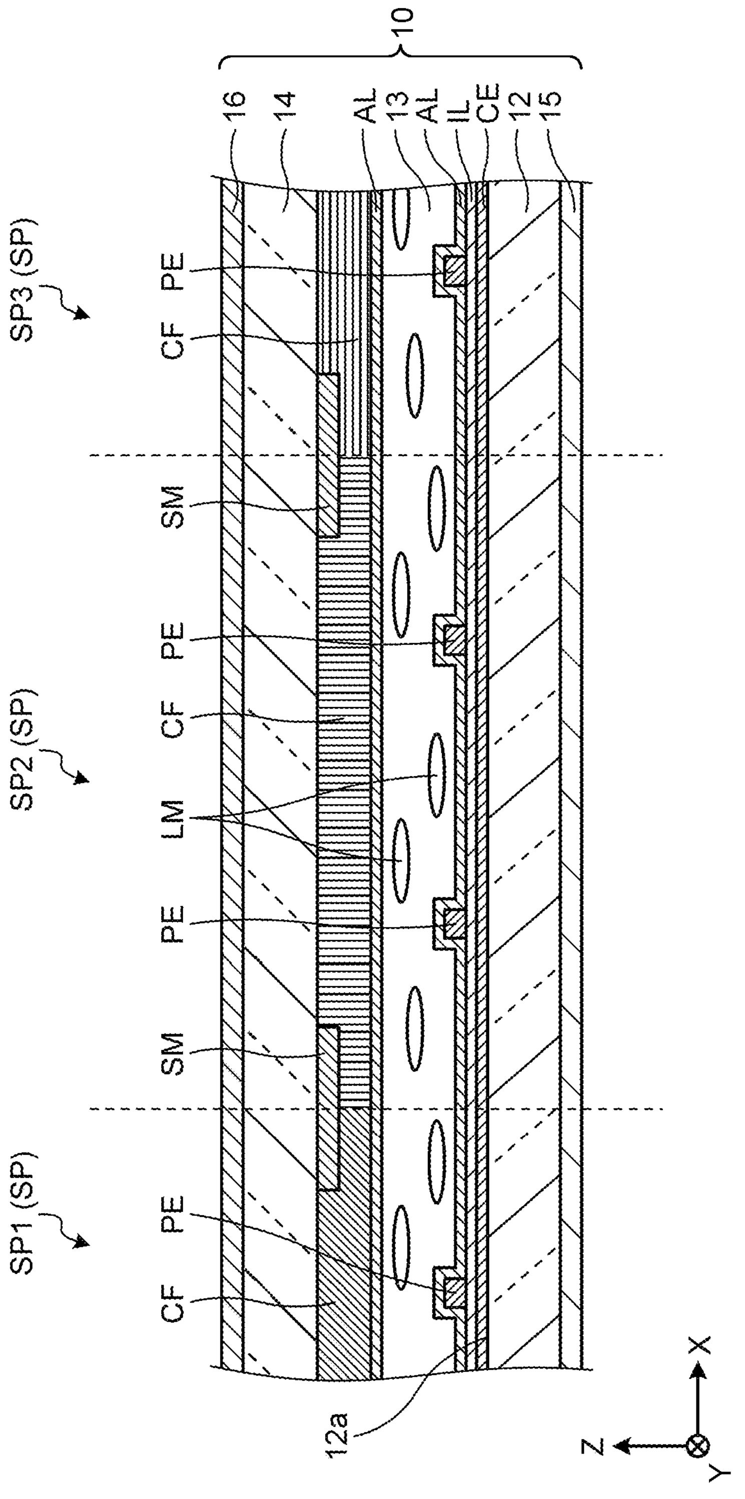
FIG. 4 is a sectional view of the display panel.

FIG. 4 is a sectional view of the display panel 10. The sub-pixel SP further includes a first substrate 12, the liquid crystal layer 13, and a second substrate 14. The first substrate 12, the liquid crystal layer 13, and the second substrate 14 are all translucent and are aligned in this order along the Z direction from the −Z side to the +Z side.

The first substrate 12 is rectangular in plan view and one first substrate 12 is provided for a plurality of the sub-pixels SP. The common electrode CE is placed on a main surface 12*a* on the +Z-side of the first substrate 12. An insulating layer IL is placed on the front surface of the common electrode CE, and the sub-pixel electrode PE and an orientation film AL are further placed.

The sub-pixel electrode PE is placed between the insulating layer IL and the orientation film AL. In this manner, the common electrode CE is placed on, and the sub-pixel electrode PE is placed above the first substrate 12. In other words, the display panel 10 is a horizontal electric field type liquid crystal display.

The second substrate 14 is located on the front surface side of the first substrate 12. The second substrate 14 is rectangular in plan view and one second substrate 14 is provided for a plurality of the sub-pixels SP. A color filter CF and a light-shielding film SM are placed on, and an orientation film AL is placed under the rear surface of the second substrate 14. The light-shielding film SM and the color filter CF are placed between the second substrate 14 and the orientation film AL.

The color filter CF is rectangular in plan view and one color filter CF is placed for one sub-pixel SP. The color filter CF is translucent, and the peak of the spectrum of light to be transmitted is predetermined. The peak of the spectrum corresponds to the color of the color filter CF. The color of the color filter CF is the same as that of the sub-pixel SP. In other words, the red first sub-pixel SP1 has a red color filter CF, the green second sub-pixel SP2 has a green color filter CF, and the blue third sub-pixel SP3 has a blue color filter CF.

The light-shielding film SM is lightproof and demarcates the sub-pixels SP. In other words, the light-shielding film SM overlaps in plan view the boundaries of the sub-pixels SP that are adjacent to each other in the X and Y directions. In FIG. 4, the signal line Lb and the scanning line Lc are omitted.

The liquid crystal layer 13 includes a plurality of liquid crystal molecules LM. The liquid crystal layer 13 is present between the first substrate 12 and the second substrate 14 and overlaps the display region DA in plan view. Specifically, the liquid crystal layer 13 is present between two orientation films AL facing each other. The orientation of the liquid crystal molecules LM is regulated by the two orientation films AL facing each other.

As illustrated in FIGS. 2 and 4, the display panel 10 further includes a first polarizing plate 15 placed on the rear surface of the first substrate 12 and a second polarizing plate 16 placed on the front surface of the second substrate 14.

The first polarizing plate 15 has a transmission axis orthogonal to the Z direction. The second polarizing plate 16 has a transmission axis orthogonal to the transmission axis of the first polarizing plate 15 and the Z direction.

As illustrated in FIGS. 1 and 2, the first substrate 12 has an exposed portion 12*b* that is exposed from the second substrate 14 in plan view. The exposed portion 12*b* is on the +X side of the second substrate 14 in plan view. An IC chip Ti including the drive circuit 11 is placed on the front surface of the exposed portion 12*b*. The front surface of the exposed portion 12*b* is part of the main surface 12*a* of the first substrate 12. The drive circuit 11 is located outside (specifically on the +X side) of the display region DA in plan view.

The drive circuit 11 outputs sub-pixel signals to the sub-pixels SP on the basis of image signals, thereby generating an electric field in the liquid crystal layer 13 and changing the orientation of the liquid crystal molecules LM. Thus, the light transmitted through the display panel 10 is modulated, to display an image.

As illustrated in FIG. 2, the light source device 20 is placed on the rear surface side of the display panel 10. The light source device 20 emits light (hereinafter described as emitted light) toward the display panel 10. The light source device 20 is, for example, a direct-lit backlight and has a plurality of light-emitting diodes (not illustrated).

As illustrated in FIGS. 1 and 2, the color separation element 30 is a rectangular plate in plan view. The color separation element 30 is larger than the display panel 10 in plan view. The periphery of the color separation element 30 is located outside of the periphery of the display panel 10 in plan view. Part of the color separation element 30 may be located outside of the display panel 10 in plan view.

As illustrated in FIG. 2, the color separation element 30 is placed between the display panel 10 and the light source device 20. The color separation element 30 is translucent, and the emitted light from the light source device 20 enters the display panel 10 through the color separation element 30.

Figure 5:
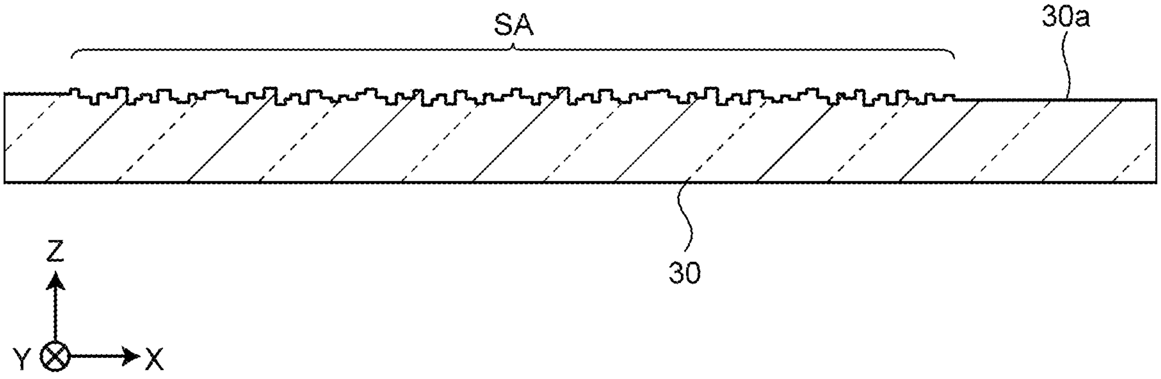
FIG. 5 is a sectional view of a color separation element.
Figure 6:
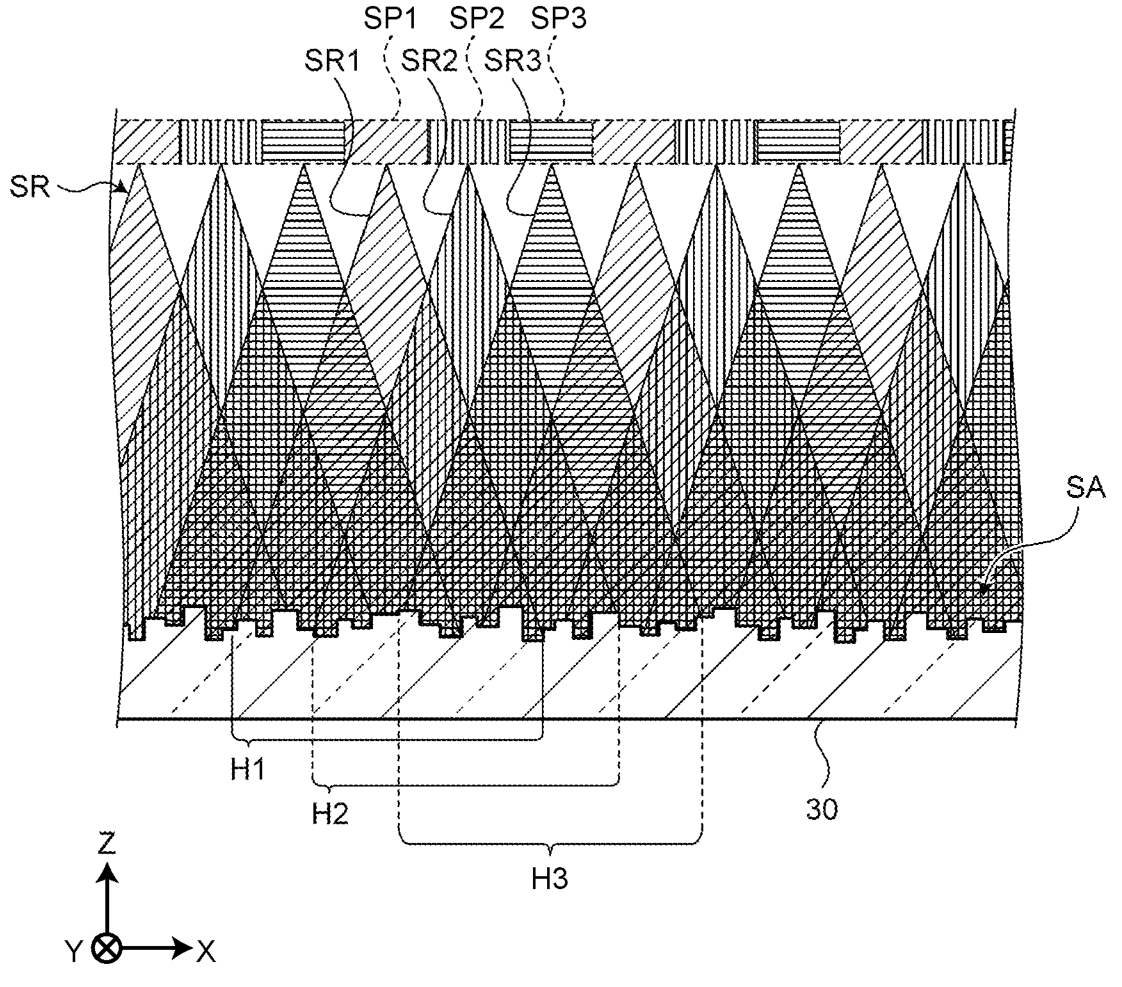
FIG. 6 is an enlarged sectional view of the color separation element.

FIG. 5 is a sectional view of the color separation element 30. FIG. 6 is an enlarged sectional view of the color separation element 30. The color separation element 30 disperses the emitted light from the light source device 20 and emits, to the pixel P, a plurality of rays of separated light SR with wavelengths different from each other. The color separation element 30 has a separation region SA that emits the separated light SR. The separation region SA is on the board surface of the color separation element 30 (front surface of the color separation element 30; hereinafter may be described as an emitting surface 30*a*) facing the display panel 10 and overlaps the display region DA in plan view.

As illustrated in FIG. 6, the separated light SR emitted from the separation region SA includes first separated light SR1 in red, the same color as the color of the first sub-pixel SP1, second separated light SR2 in green, the same color as the second sub-pixel SP2, and third separated light SR3 in blue, the same color as the third sub-pixel SP3. In the separation region SA, the front surface of the color separation element 30 has a given uneven shape.

The given uneven shape is such that the first separated light SR1 gathers in the first sub-pixel SP1 from a first range H1, which is larger than the first sub-pixel SP1 in plan view and overlaps the first sub-pixel SP1 in plan view. The given uneven shape is such that the second separated light SR2 gathers in the second sub-pixel SP2 from a second range H2, which is larger than the second sub-pixel SP2 in plan view and overlaps the second sub-pixel SP2 in plan view. Furthermore, the given uneven shape is such that the third separated light SR3 gathers in the third sub-pixel SP3 from a third range H3, which is larger than the third sub-pixel SP3 in plan view and overlaps the third sub-pixel SP3 in plan view.

There are a plurality of the first ranges H1 corresponding to the first sub-pixels SP1. There are a plurality of the second ranges H2 corresponding to the second sub-pixels SP2. There are a plurality of the third ranges H3 corresponding to the third sub-pixels SP3. The first range H1, the second range H2, and the third range H3 have portions overlapping each other in plan view.

In this manner, the color separation element 30 separates the emitted light from the light source device 20 for each wavelength corresponding to the color of the individual color filter CF, and causes the light (separated light SR) with the wavelength corresponding to the color filter CF to enter and be transmitted through the color filter CF. Thus, the loss of quantity of the emitted light from the light source device 20 can be suppressed and the utilization efficiency of the emitted light can be increased compared to a case in which the display device 1 does not include the color separation element 30 and the emitted light from the light source device 20 directly enters the display panel 10.

As illustrated in FIG. 2, the adhesive portion 40 is present between the display panel 10 and the color separation element 30. The adhesive portion 40 bonds the display panel 10 to the color separation element 30. As illustrated in FIG. 1, the adhesive portion 40 is present between the peripheries of the display region DA and the separation region SA and the periphery of the first substrate 12 in plan view. Specifically, the adhesive portion 40 is at the peripheral portion of the first substrate 12. The first polarizing plate 15 is inside the adhesive portion 40 in plan view.

The adhesive portion 40 has a discontinuous portion 40*a*. The discontinuous portion 40*a* is a gap formed by the discontinuity of the adhesive portion 40. The discontinuous portion 40*a* causes the space inside of the adhesive portion 40 to communicate with the space outside of the adhesive portion 40 between the display panel 10 and the color separation element 30.

In the present embodiment, there is one discontinuous portion 40*a* at a position on the −X and +Y side of the adhesive portion 40. Not to mention, the position of the discontinuous portion 40*a* is not limited to the position on the −X and +Y side of the adhesive portion 40, and the number of the discontinuous portions 40*a* is not limited to one.

The adhesive portion 40 is formed by an adhesive. The adhesive is a one-part adhesive and, for example, an ultraviolet (UV) curable adhesive.

As illustrated in FIG. 2, the adhesive portion 40 contains a plurality of gap members 41 of a given size. The gap member 41 is spherical, for example, and has a given diameter corresponding to the given size. The ratio of the total volume of the gap members 41 to the volume of the adhesive portion 40 is approximately 2%. The gap member 41 has a state in which all of the gap member 41 is covered by the adhesive portion 40 and a state in which part of the gap member 41 is exposed from the adhesive portion 40.

The hardness of the gap member 41 is higher than that of the adhesive portion 40. Therefore, the gap member 41 is less deformable to external forces than the adhesive portion 40.

The gap member 41 is sandwiched by the opposite surface 10*b* of the display panel 10 and the emitting surface 30*a* of the color separation element 30. Thus, the distance in the Z direction between the display panel 10 and the color separation element 30 is substantially constant at the given diameter. The given diameter is defined as the size at which the separated light SR gathers in the sub-pixel SP.

Method for Manufacturing Display Device 1

A bonding process for bonding the display panel 10 to the color separation element 30 in a method for manufacturing the display device 1 will be described next.

The bonding process includes an application step of applying the adhesive to the display panel 10, a sprinkling step of sprinkling the gap member 41 on the display panel 10 to which the adhesive has been applied, a sticking step of sticking the color separation element 30 and the display panel 10 together, and a curing step of curing the adhesive. The application step, the sprinkling step, the sticking step, and the curing step are performed in this order.

Figure 7:
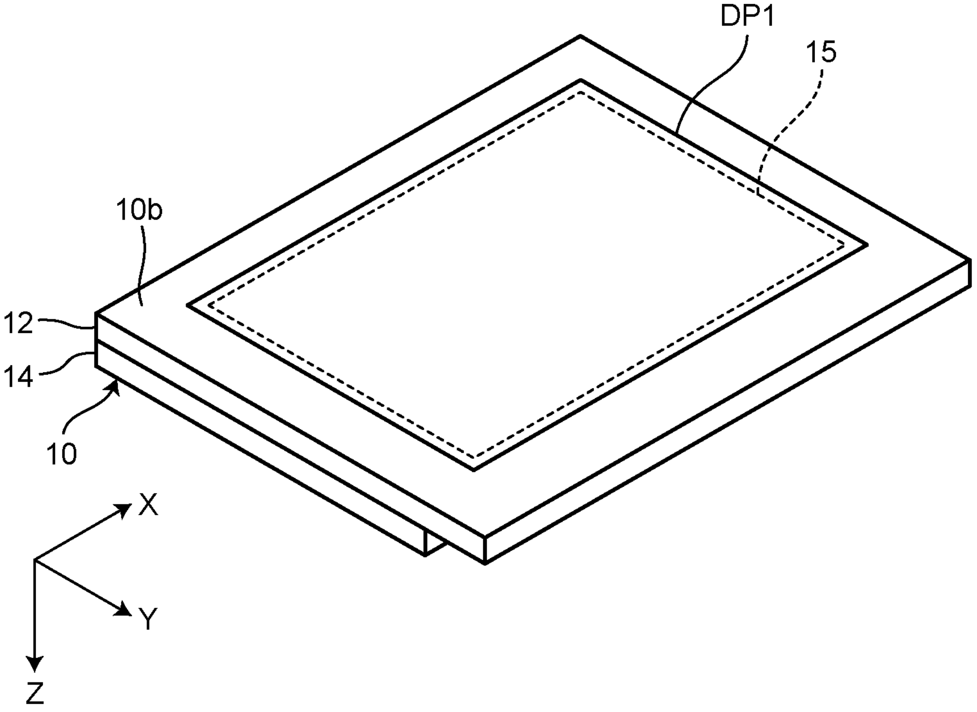
FIG. 7 is a perspective view illustrating a display panel 10 before an adhesive AD is applied.

FIG. 7 is a perspective view illustrating the display panel 10 before an adhesive AD is applied. The display panel 10 before the adhesive AD is applied has release paper DP1 covering the region on the opposite surface 10*b* that overlaps the display region DA on the display surface 10*a* in plan view. The release paper DP1 protects the first polarizing plate 15. The release paper DP1 may be affixed to the first polarizing plate 15 in advance.

Figure 8:
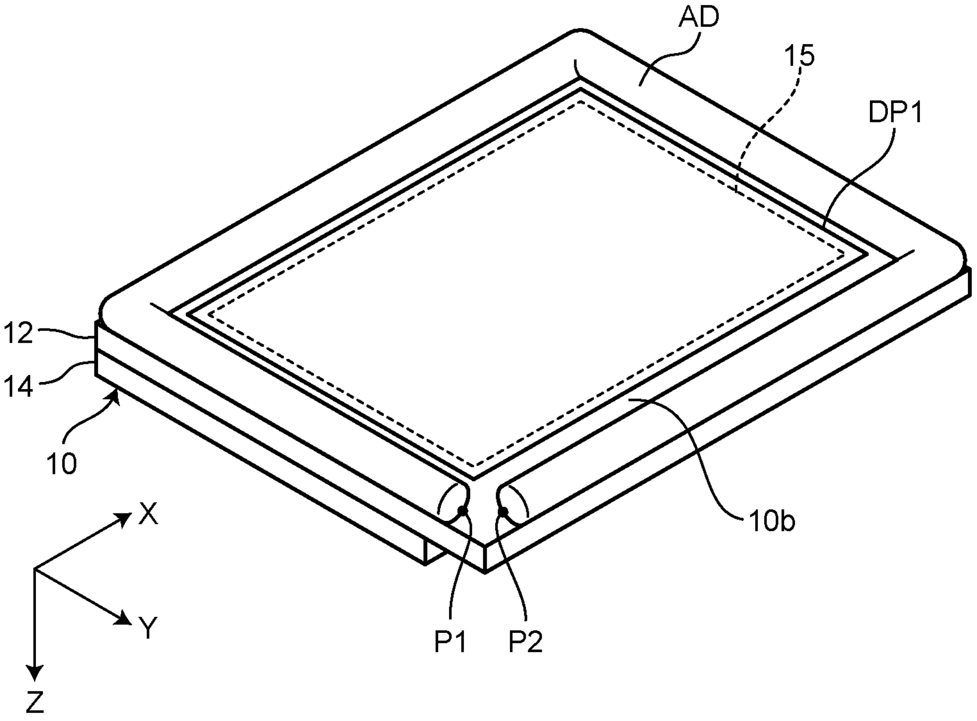
FIG. 8 is a perspective view illustrating the display panel 10 to which the adhesive AD has been applied at an application step.

FIG. 8 is a perspective view illustrating the display panel 10 to which the adhesive AD has been applied at the application step. At the application step, the adhesive AD is applied around the release paper DP1 on the opposite surface 10*b* of the display panel 10. In other words, at the application step, the adhesive AD is applied to the display panel 10 having the display surface 10*a* where images are displayed and the opposite surface 10*b* on the opposite side of the display surface 10*a*, on the opposite surface 10*b*. The adhesive AD is applied using a dispenser.

A start position P1, where the application of the adhesive AD starts, and an end position P2, where the application of the adhesive AD ends, are different from each other in plan view. With this configuration, the discontinuous portion 40*a* in the adhesive portion 40 is formed when the adhesive AD cures.

As described above, the adhesive AD is a one-part adhesive and has no mixture. Thus, there is no mixing step of mixing a mixture into the adhesive AD in the manufacture of the display device 1. Therefore, the adhesive AD has no voids created by air mixed in at a mixing step.

Figure 9:
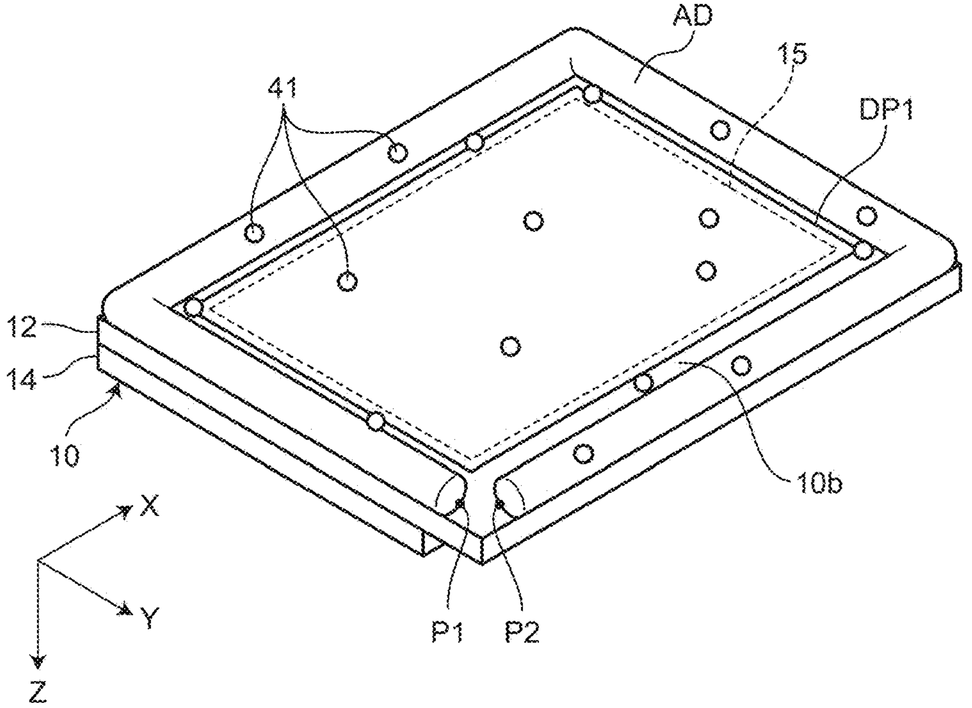
FIG. 9 is a perspective view illustrating the display panel 10 with a gap member 41 sprinkled at a sprinkling step.

FIG. 9 is a perspective view illustrating the display panel 10 with the gap member 41 sprinkled at the sprinkling step. At the sprinkling step, the gap member 41 is sprinkled on the opposite surface 10*b*. In other words, at the sprinkling step, the gap member 41 of the given size is sprinkled on the opposite surface 10*b* of the display panel 10 to which the adhesive AD has been applied.

The sprinkled gap member 41 attaches to the rear surface of the release paper DP1, to between the release paper DP1 and the adhesive AD on the opposite surface 10*b*, and to the outer surface of the adhesive AD.

Figure 10:
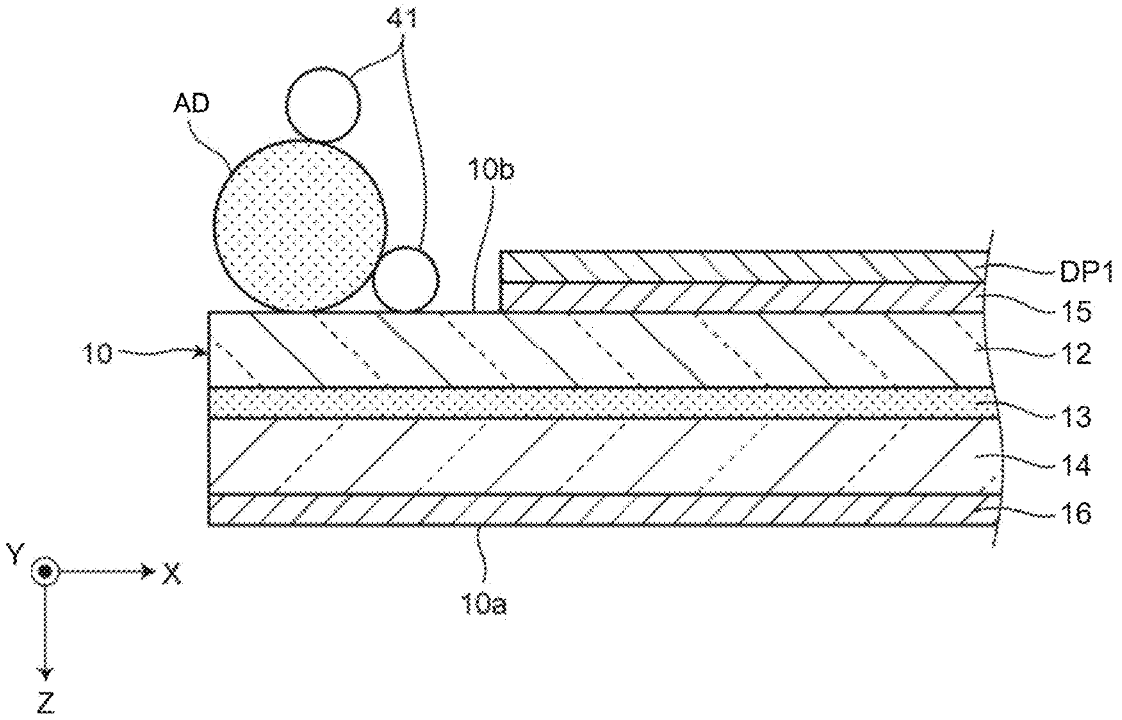
FIG. 10 is a view illustrating the gap member 41 attaching to an outer surface of the adhesive AD.

FIG. 10 is a view illustrating the gap member 41 attaching to the outer surface of the adhesive AD. At the sprinkling step, air is further sprayed on the opposite surface 10*b* after the gap member 41 has been sprinkled. With this operation, the gap member 41 present on the rear surface of the release paper DP1 and on between the release paper DP1 and the adhesive AD on the opposite surface 10*b* moves and attaches to the outer surface of the adhesive AD, as illustrated in FIG. 10.

In this manner, the sprinkling step includes a step of causing the gap member 41 to attach to the adhesive AD for the display panel 10 on which the gap member 41 has been sprinkled. The gap member 41 may be moved by shaking the display panel 10 after the gap member 41 has been sprinkled.

The sprinkling step further includes a step of removing the release paper DP1 from the display panel 10 on which the gap member 41 has been sprinkled. The step of removing the release paper DP1 is performed after the step of causing the gap member 41 to attach to the adhesive AD.

Figure 11:
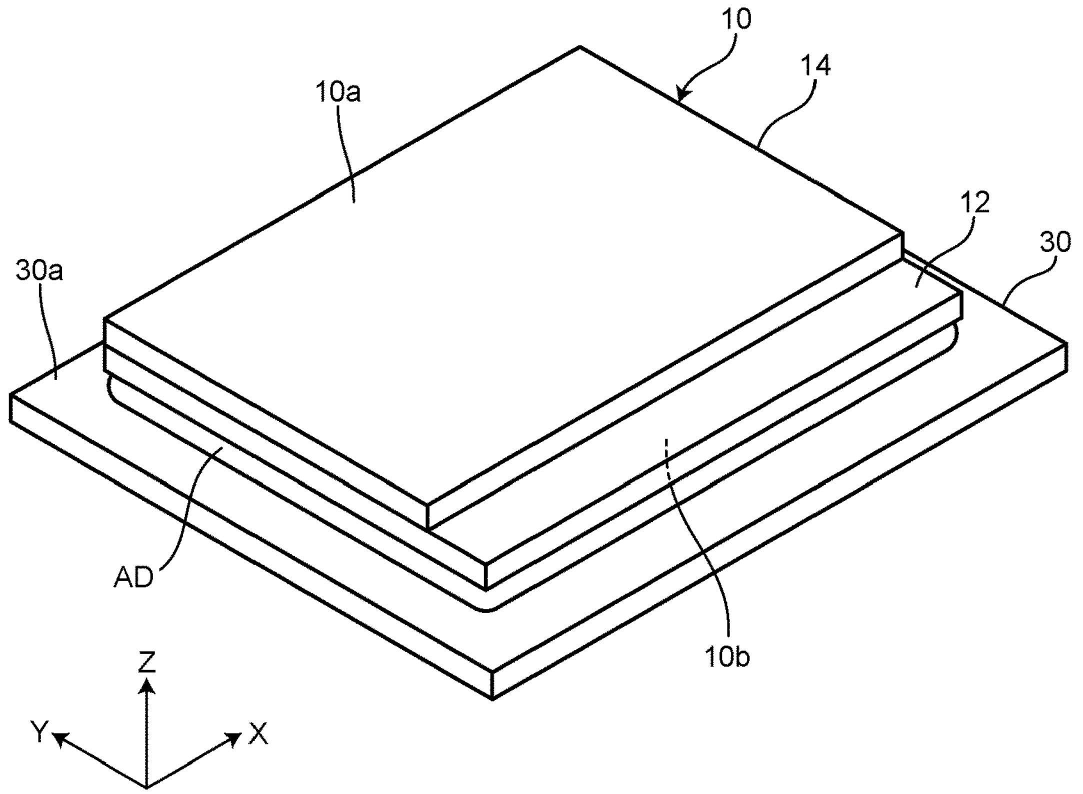
FIG. 11 is a perspective view illustrating a color separation element 30 and the display panel 10 being stuck together at a sticking step.

FIG. 11 is a perspective view illustrating the color separation element 30 and the display panel 10 being stuck together at the sticking step. At the sticking step, the board surface (emitting surface 30*a*) of the color separation element 30 and the opposite surface 10*b* of the display panel 10 on which the gap member 41 has been sprinkled are stuck together with the adhesive AD therebetween. At the sticking step, the gap member 41 is sandwiched by the board surface (emitting surface 30*a*) of the color separation element 30 and the opposite surface 10*b* of the display panel 10.

When the color separation element 30 and the display panel 10 are stuck together, air that is inside of the adhesive AD in plan view between the color separation element 30 and the display panel 10 leaks outward from the adhesive AD between the start position P1 and the end position P2 of the adhesive AD illustrated in FIGS. 8 and 9. Thus, deformation of the color separation element 30 and the display panel 10 due to the force created by air compression between the color separation element 30 and the display panel 10 can be prevented.

Next, the adhesive AD is cured at the curing step. As described above, the adhesive AD is a UV curable adhesive, and the adhesive AD is irradiated with UV light of a given integrated light quantity at the curing step. The given integrated light quantity is derived from an experiment or the like conducted in advance and is the integrated light quantity in which the adhesive AD cures sufficiently. As the adhesive AD cures, the adhesive portion 40 having the discontinuous portion 40*a* is formed. The liquid crystal layer 13 and the second polarizing plate 16 are omitted in FIGS. 7, 8, 9, and 11.

In this manner, the gap member 41 is not mixed into the adhesive AD before being applied to the display panel 10, but is sprinkled on the display panel 10 to which the adhesive AD has been applied. If the adhesive AD has voids due to the gap member 41 being mixed into the adhesive AD before being applied to the display panel 10, the voids may become a starting point for the adhesive AD to split when the adhesive AD is discharged from the dispenser. Splitting of the adhesive AD decreases the contact area between the display panel 10 and the adhesive AD and the contact area between the color separation element 30 and the adhesive AD and decreases the adhesive force.

On the contrary, the adhesive AD has no voids in the method for manufacturing the display device 1 described above. Therefore, a decrease in adhesive force of the adhesive portion 40 due to splitting of the adhesive AD causing the adhesive portion 40 to split can be suppressed. Foreign matter can be prevented from entering through a gap in the adhesive portion 40 formed by the splitting of the adhesive AD.

First Modification of Method for Manufacturing Display Device 1

A first modification of the method for manufacturing the display device 1 will be described next mainly with respect to parts that differ from the method for manufacturing the display device 1 described above.

Figure 12:
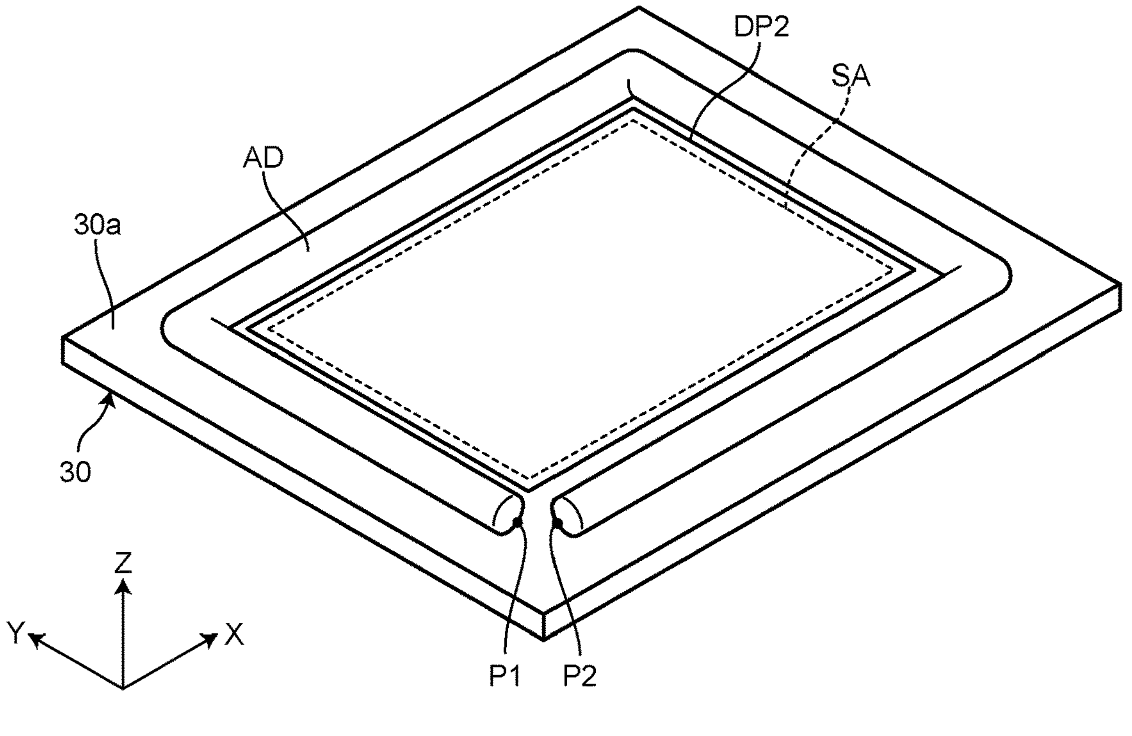
FIG. 12 is a perspective view illustrating a color separation element to which an adhesive has been applied in a method for manufacturing a display device according to a first modification of the present disclosure.

In this first modification, the adhesive AD is applied to the color separation element 30 at the application step. FIG. 12 is a perspective view illustrating the color separation element 30 to which the adhesive AD has been applied in the method for manufacturing the display device 1 according to the first modification of the present disclosure.

At an application step of this first modification, the adhesive AD is applied to the emitting surface 30*a* of the color separation element 30. The color separation element 30 of this first modification has release paper DP2 covering the separation region SA of the emitting surface 30*a* that emits the separated light SR. The release paper DP2 protects the separation region SA. The adhesive AD is applied around the release paper DP2 on the emitting surface 30*a*.

At a sprinkling step of this first modification, the gap member 41 of the given size is sprinkled on the emitting surface 30*a* of the color separation element 30 to which the adhesive AD has been applied. The sprinkling step of this first modification includes a step of causing the gap member 41 to attach to the adhesive AD for the color separation element 30 on which the gap member 41 has been sprinkled. The sprinkling step of this first modification further includes a step of removing the release paper DP2 from the color separation element 30 on which the gap member 41 has been sprinkled.

At a sticking step of this first modification, the emitting surface 30*a* of the color separation element 30 on which the gap member 41 has been sprinkled and the board surface (opposite surface 10*b*) of the display panel 10 are stuck together with the adhesive AD therebetween. At the sticking step, the gap member 41 is sandwiched by the emitting surface 30*a* of the color separation element 30 and the opposite surface 10*b* of the display panel 10.

Another Modification of Method for Manufacturing Display Device 1

For example, when the display panel 10 does not have the release paper DP1, the sprinkling step does not include the step of removing the release paper DP1. The sprinkling step does not have to include the step of causing the gap member 41 to attach to the adhesive AD. In this case, the gap member 41 may be sprinkled from outside of the adhesive AD in plan view.

Furthermore, the adhesive portion 40 may be placed around the entire perimeter of the display region DA in plan view, without the discontinuous portion 40*a*. The adhesive AD may be an adhesive other than a UV curable adhesive, such as a thermosetting adhesive, for example.

It is understood that any other effects brought about by the modes described in the embodiments that are obvious from the description of the present specification or that would be conceived of by a person skilled in the art are naturally brought about by the present disclosure.

What is claimed is:

1. A method for manufacturing a display device, the method comprising:

applying an adhesive to a display panel having a display surface where an image is displayed and an opposite surface on an opposite side of the display surface, on the opposite surface;

sprinkling a gap member of a given size onto the adhesive on the opposite surface of the display panel and sticking together a board surface of a color separation element and the opposite surface of the display panel on which the gap member has been sprinkled, with the adhesive between the board surface and the opposite surface, the color separation element dispersing light from a light source and emitting a plurality of rays of separated light with wavelengths different from each other, wherein the display panel has a release paper covering a region on the opposite surface that overlaps a display region on the display surface in a plan view, air is sprayed on the opposite surface after sprinkling the gap member, and at the applying the adhesive to the display panel, the adhesive is applied from a starting position to an ending position different from the starting position of the opposite surface to allow the adhesive to have a discontinuous portion between the starting position and the ending position, in a plan view, the discontinuous portion being a gap and causing a space surrounded by the adhesive portion to communicate with a space outside the adhesive portion between the display panel and the color separation element.

2. The method for manufacturing a display device according to claim 1, wherein at the sticking together the color separation element and the display panel, the gap member attached to the adhesive is sandwiched by the board surface of the color separation element and the opposite surface of the display panel.

3. The method for manufacturing a display device according to claim 1, wherein the sprinkling a gap member further comprises causing the gap member to attach to the adhesive for the display panel on which the gap member has been sprinkled.

4. The method for manufacturing a display device according to claim 1, wherein at the applying an adhesive, the adhesive is applied around the release paper on the opposite side, and the sprinkling the gap member further comprises removing the release paper from the display panel on which the gap member has been sprinkled.

5. A method for manufacturing a display device, the method comprising:

applying an adhesive to a color separation element having an emitting surface, on the emitting surface, the color separation element dispersing light from a light source and emitting a plurality of rays of separated light with wavelengths different from each other;

sprinkling a gap member of a given size onto the adhesive on the emitting surface of the color separation element; and sticking together a board surface of a display panel and the emitting surface of the color separation element on which the gap member has been sprinkled, with the adhesive between the board surface and the emitting surface, wherein the color separation element has a release paper covering a region on the emitting surface, the region corresponding to a display region of the display panel in a plan view, air is sprayed on an opposite surface after sprinkling the gap member, and at the applying the adhesive to the color separation element, the adhesive is applied from a starting position to an ending position different from the starting position of the emitting surface to allow the adhesive to have a discontinuous portion between the starting position and the ending position, in a plan view, the discontinuous portion being a gap and causing a space surrounded by the adhesive portion to communicate with a space outside the adhesive portion between the display panel and the color separation element.

6. The method for manufacturing a display device according to claim 5, wherein at the applying an adhesive, the adhesive is applied around the release paper on the emitting surface, and the sprinkling the gap member further comprises removing the release paper from the color separation element on which the gap member has been sprinkled.

* * * * *